(12) United States Patent
Chen

(10) Patent No.: US 7,178,916 B1
(45) Date of Patent: Feb. 20, 2007

(54) THREE-PIECE COMBINATIVE DEVICE WITH EYEGLASSES AND ATTACHMENT SUNGLASSES

(76) Inventor: Lee-Tsung Chen, P.O. Box 697, Fongyuan City 420, Taichung County (TW)

( * ) Notice: Subject to any disclaimer, the term of this patent is extended or adjusted under 35 U.S.C. 154(b) by 0 days.

(21) Appl. No.: 11/246,056

(22) Filed: Oct. 11, 2005

(51) Int. Cl.
*G02C 9/00* (2006.01)
(52) U.S. Cl. ............................................ 351/47; 351/57
(58) Field of Classification Search ................ 351/41, 351/44, 47, 48, 57, 58
See application file for complete search history.

(56) References Cited

U.S. PATENT DOCUMENTS 6,926,402 B1 * 8/2005 Chen ........................... 351/47

2003/0197830 A1 * 10/2003 Taniguchi .................... 351/47

* cited by examiner

*Primary Examiner*—Huy K. Mai

(57) ABSTRACT

A three-piece combinative device with eyeglasses and attachment sunglasses includes a primary eyeglasses having a pair of rimmed lenses, a pair of temples and a bridge including a horizontal slot in the center, a fork like fastener having a tongue on central inner side inserted into the horizontal slot and a pair of prongs opposite to the tongue each including a magnet embedded in the distal portion, the attachment sunglasses having a pair of rimmed darkglasses, a bridge, a fork like projection projected inward from a central inner side of the bridge attached on the top of the bridge of the eyeglasses and a pair prongs each including a corresponding magnet embedded in the distal portion respectively engaged with and attracted by the pair of magnets of the fastener by which the attachment sunglasses is firmly attached to the original eyeglasses.

1 Claim, 5 Drawing Sheets

THREE-PIECE COMBINATIVE DEVICE WITH EYEGLASSES AND ATTACHMENT SUNGLASSES

BACKGROUND OF THE INVENTION

The present invention relates to eyeglasses and more particularly to a three-piece combinative device with eyeglasses and attachment sunglasses.

An eyeglasses is of an article helpful to the people who have eyesight problems and becomes popular in the modern society. Both the nearsightedness and the farsightedness require an eyeglasses which not only improves their eyesight problems and protect their eyes from against the strong lights and/or the ultraviolet rays yet also beatifies their faces. The nearsightedness needs to wear an eyeglasses every time when he is wakened up. If he walks outdoor under strong sunlight, he has to wear a sunglasses which has the same focus of lenses fitted to him. So that he always carries two kind of eyeglasses with him for different requirements that is inconvenient and costs more for him. If he combines an attachment sunglasses with his primary eyeglasses when walks outdoor under the strong sunlight. It will be cheap and convenient for him. Most of the producers manufactured the attachment sunglasses of different types to meet the requirement of the nearsightedness.

Those prior art attachment sunglasses are of varied design. But most of them embed pieces of magnets in two sides of the bridge made engageable with the pieces of corresponding magnets in the primary eyeglasses for combining the sunglasses with the primary eyeglasses. However, if the original eyeglasses has no magnet embedded, these types of sunglasses are unable to be combined with. Thus, the user has to buy a new eyeglasses having magnets to match the attachment sunglasses.

Another prior art design of the sunglasses attaching to the primary eyeglasses. Both of which has corresponding magnets in their outer sides of rims engageable with one another. Besides, the sunglasses has to has a hook enabling to hook the bridge of the primary eyeglasses. This also belongs to the pair of design which still causes inconvenience to the users.

SUMMARY OF THE PRESENT INVENTION

The present invention has a main object to provide a three-piece combinative device with eyeglasses and attachment sunglasses which uses a three-piece combinative device to connect the attachment sunglasses with the primary eyeglasses. The device is easy to manufacture and readily to assemble in order to present neat and uniform beautified appearance.

Accordingly, the three-piece combinative device of the present invention comprises generally a primary eyeglasses having a pair rimmed lenses connected by a bridge which has a horizontal slot in the center and a pair of temples. An attachment sunglasses having a fork like projection projected inward from the upper inner surface of the bridge attached on the top of the bridge of the primary eyeglasses and having a magnet embedded in each prong of the projection and a fork like fastener having tongue inserted into the horizontal slot in the bridge of the primary eyeglasses and a corresponding magnet embedded in each of the prongs engaged with the magnets of the projection of the attachment sunglasses. So that the attachment sunglasses is tightly attached to the primary eyeglasses.

The present invention will become more fully understood by reference to the following detailed description thereof when read in conjunction with the attached drawings.

DETAILED DESCRIPTION OF THE PREFERRED EMBODIMENT

Figure 1:
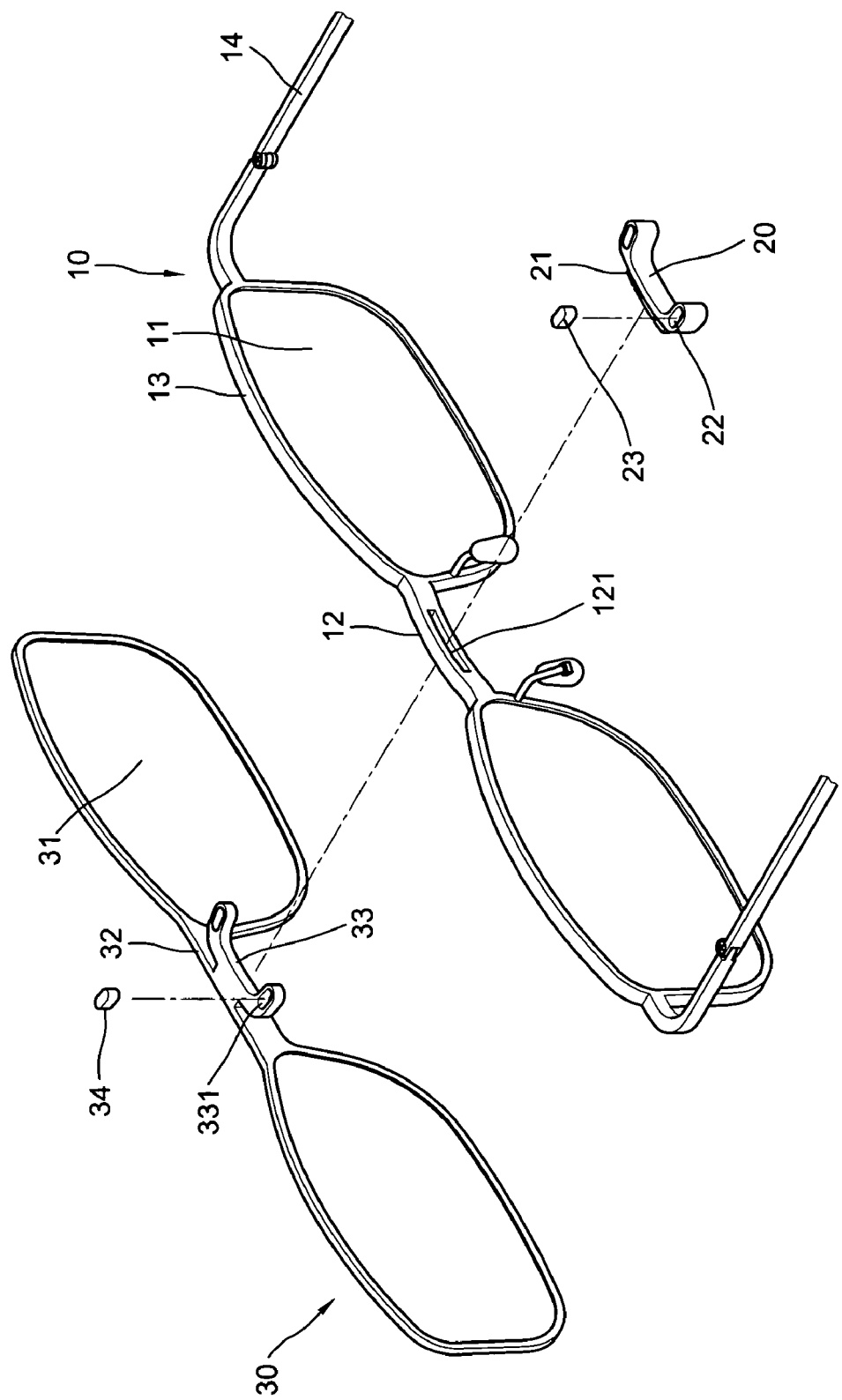
FIG. 1 is a perspective view of a three-piece combinative device of the preferred Embodiment of the present invention.
Figure 2:
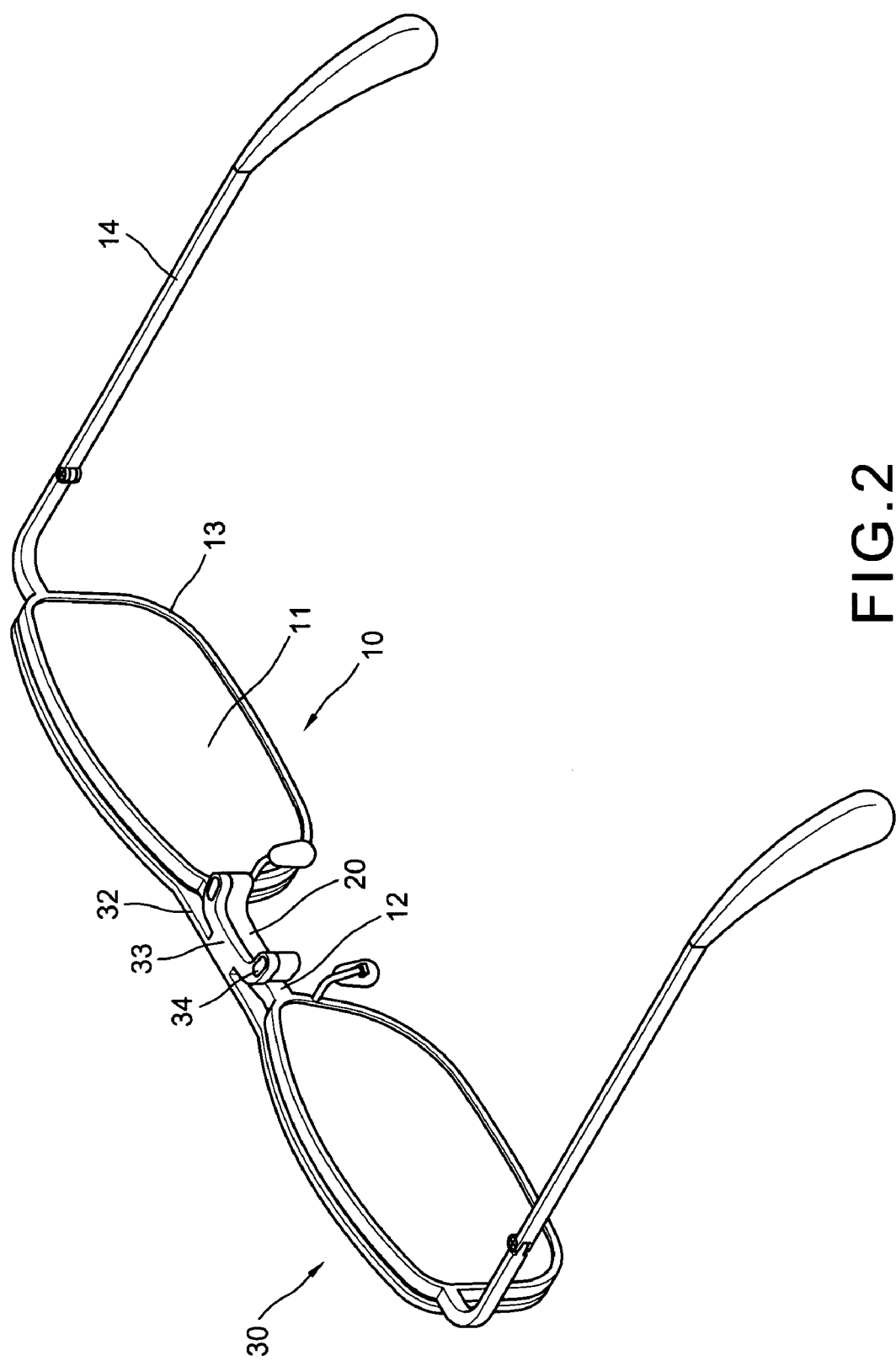
FIG. 2 is a perspective view to show an assembly of the FIG. 1.
Figure 3:
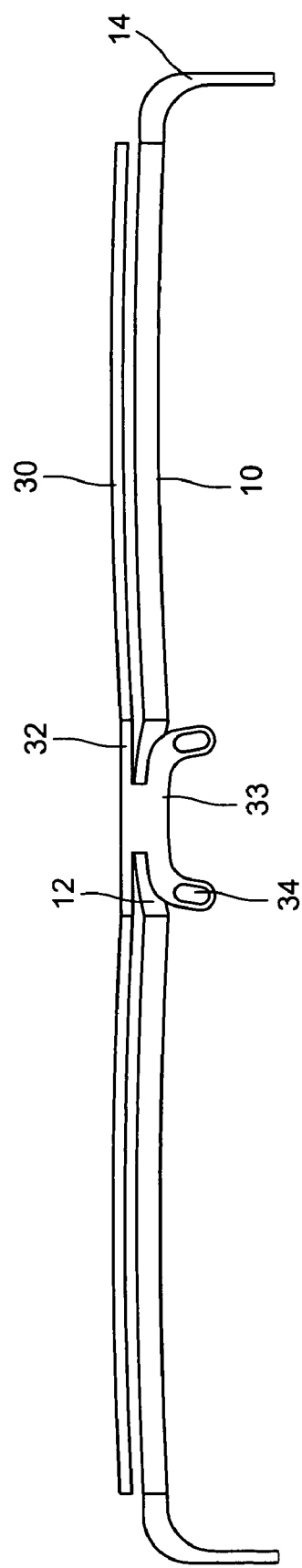
FIG. 3 is a top view of FIG. 2.
Figure 4:
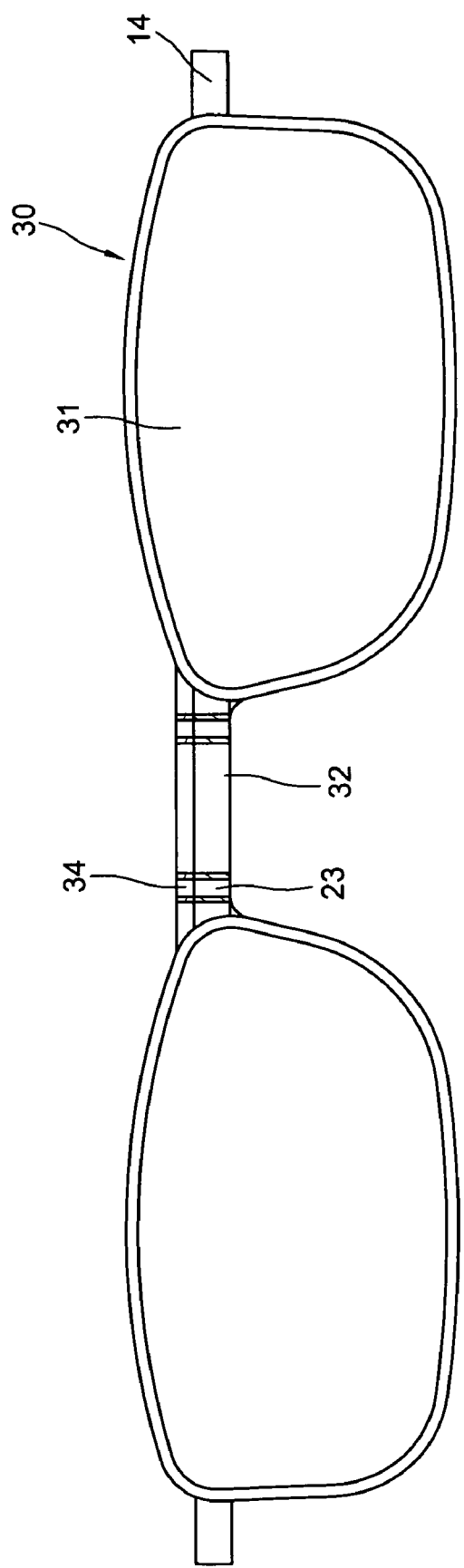
FIG. 4 is an elevational view of FIG. 2.
Figure 5:
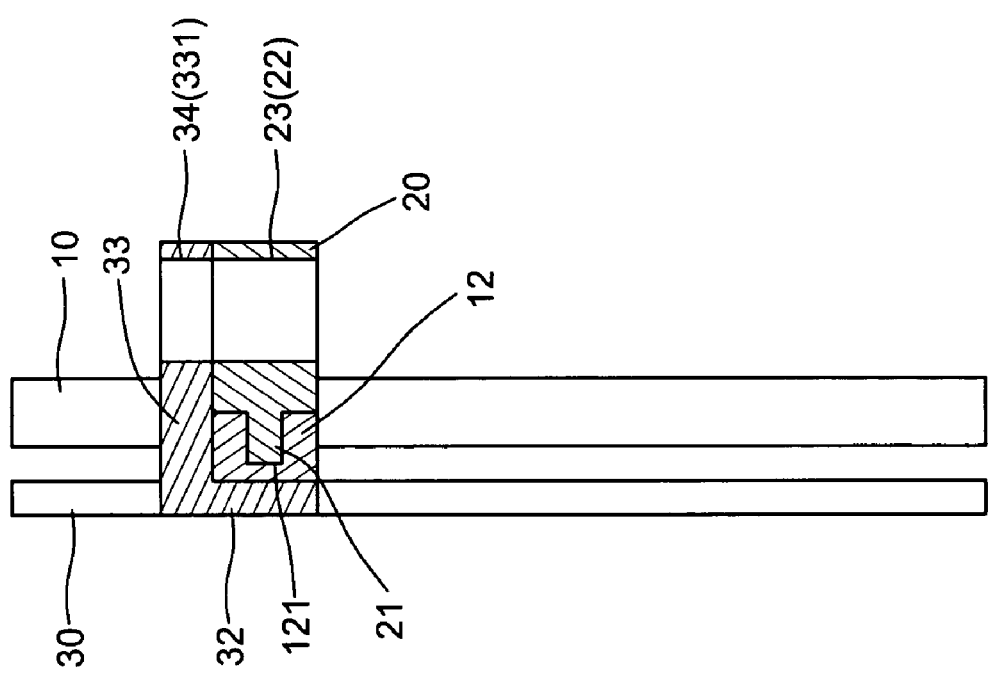
FIG. 5 is a sectional view to show the three-piece combinative device of the present invention.

With reference to the drawings and initiated from FIGS. 1, 2, 3 and 4, the three-piece combinative device for attachment of a sunglasses to a primary eyeglasses comprises a primary eyeglasses 10 which is composed of a pair of lenses 11 surrounded by a pair of rims 13 and connected on their inner sides by a bridge 12 which has a horizontal slot 121 in center and a pair of temples 14 respectively pivoted to the upper outer sides of the rims 13, a fork like fastener 20 having a tongue 21 centrally form on inner side releasably inserted into the horizontal slot 121 of the eyeglasses 10 and a pair of prongs 22 each embedded a magnet 23 in their distal recesses 22, an attachment sunglasses 30 composed of a pair of rimmed darkglasses 31 and connected by a bridge 32 therebetween and a fork like projection 33 centrally projected inward from the upper inner side thereof. The projection 33 has a pair of prongs 331 each having a corresponding magnet 34 embedded in the distal portion and engageable with the magnets 23 of the fastener 20.

Upon the above arrangement, because of the three-piece combinative device provides a convenient manufacturing and assembling which present a neat and uniform beatified appearance especially eliminates the two-piece (an eyeglasses and a sunglasses) directly coupling method.

When attach the attachment sunglasses 30 to the primary eyeglasses 10, first insert the tongue 21 of the fastener 20 into the horizontal slot 121 of the primary eyeglasses 10. Then attach the fork like projection 33 on the top of the bridge 12 of primary eyeglasses 10, their corresponding magnets 23 and 34 will be automatically attracted each other. So that the attachment sunglasses 30 is firmly attached to the primary eyeglasses 10.

Then disassembling, the user only removes the attachment sunglasses 30 from the primary eyeglasses 10 and collects and keeps the fastener 20 with him.

If embed a pair of magnets in two outer sides of the rims 13 of the primary eyeglasses and embed the corresponding magnets in the outer side of the rims, it also achieves the attachment activity. However, this modification is also in the scope of the present invention.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A three-piece combinative device with eyeglasses and attachment sunglasses comprising:

primary eyeglasses having two lenses respectively engaged within a pair of rims, a bridge connected the pair of rims including a horizontal slot in center and a pair of temples respectively pivoted with an outer side of said rims;

a fork like fastener having a tongue centrally formed in inner side thereof and inserted into the horizontal slot of the primary eyeglasses and a pair of prongs formed opposite to said tongue each including a magnet embedded in distal portion;

attachment sunglasses having a pair of rimmed darkglasses connected by a sunglasses bridge therebetween and a fork like projection including a pair of prongs projected inward from an inner side of said sunglass bridge and attached on a top of the bridge of said primary eyeglasses and a pair of corresponding magnets respectively embedded in distal portion of said pair of projection prongs made engageable with the magnets of said fastener;

whereby said attachment sunglasses helped by said fork like fastener and mutual attraction of said magnets to firmly attached to said primary eyeglasses.

* * * * *